United States Patent [19]

Morimoto

[11] 4,450,627

[45] May 29, 1984

[54] DEVICE FOR DETERMINING A CORRECT SAWING POSITION FOR A PORTABLE ROTARY SAWING MACHINE

[75] Inventor: Hiroyuki Morimoto, Hiroshima, Japan

[73] Assignee: Shindaiwa Kogyo Co., Ltd., Hiroshima, Japan

[21] Appl. No.: 321,056

[22] Filed: Nov. 13, 1981

[30] Foreign Application Priority Data

| Jul. 6, 1981 | [JP] | Japan | 56-101111[U] |
| Jul. 7, 1981 | [JP] | Japan | 56-101251[U] |
| Jul. 22, 1981 | [JP] | Japan | 56-109695[U] |
| Aug. 10, 1981 | [JP] | Japan | 56-118942[U] |
| Aug. 10, 1981 | [JP] | Japan | 56-118943[U] |

[51] Int. Cl.³ .................................. B23D 47/00
[52] U.S. Cl. .......................... 30/391; 83/520
[58] Field of Search ............. 30/388, 390, 391, 288, 30/295; 83/478, 520; 74/609

[56] References Cited

U.S. PATENT DOCUMENTS

| 1,312,651 | 8/1919 | Walters | 83/520 X |
| 1,780,173 | 11/1930 | Crowe | 30/391 |
| 2,745,248 | 6/1957 | Doerner | 30/391 |
| 2,876,810 | 3/1959 | Peterson et al. | 30/391 X |
| 3,373,489 | 3/1968 | Giles | 30/388 |
| 3,662,796 | 5/1972 | Batistelli | 30/390 |
| 4,241,505 | 12/1980 | Bodycomb et al. | 30/390 |

Primary Examiner—E. R. Kazenske
Assistant Examiner—Douglas D. Watts
Attorney, Agent, or Firm—Cushman, Darby & Cushman

[57] ABSTRACT

A new and unique device for determining a correct sawing position for a portable rotary sawing machine is disclosed which has a rectangular opening or watching window provided on the front part of a stationary protective cover so that an operator clearly watches a rotary saw therethrough. An alignment is ensured for the intended correct sawing operation by watching the rotary saw, indicator gauge and scribing line on a workpiece to be sawn. The rectangular opening or watching window is removably closed with a transparent cover plate.

According to other aspect of the invention the device is constructed such that the intended alignment is achieved by watching an indicator line or holes, indicator gauge and scribing line on a workpiece, said indicating line or holes being provided on the front part of the stationary protective cover in the peripheral direction. Further, according to another aspect of the invention the whole stationary protective cover or a part thereof is constructed of transparent material so that he clearly watches the rotary saw at a glance. The required alignment is ensured by watching a straight line extending through the rotary saw, indicator gauge and scribing line on a workpiece, while he holds the rotary sawing machine in front of the workpiece.

25 Claims, 16 Drawing Figures

DEVICE FOR DETERMINING A CORRECT SAWING POSITION FOR A PORTABLE ROTARY SAWING MACHINE

BACKGROUND OF THE INVENTION

1. Field of the Invention

The present invention relates to a device for determining a correct sawing position for a portable rotary machine with an indicator gauge having a V-shaped notch, said indicator guage being fixedly secured to the side wall of a base which is adapted to be slidably mounted on a workpiece to be sawn, wherein an alignment is achieved for the intended correct sawing machine by watching a straight line extending through a rotary saw, indicator gauge and scribing line on a workpiece to be sawn.

2. Description of the Prior Art

As is well known, the conventional portable rotary sawing machine has a rotary saw of which upper part is fully encased in a stationary protective cover. Thus, any one can not watch the sawing tips around the periphery of the rotary saw during rotation of the latter. To allow an operator to recognize the location corresponding to the rotary saw an indicator gauge with a V-shaped notch is fixedly arranged on the side wall of the base, as illustrated in several drawings among the accompanying ones. When locating a correct sawing position prior to starting sawing operation, he watches both the indicator gauge and the scribing line on the workpiece so as to settle an alignment for the intended sawing operation. However it has been pointed out as a drawback with respect to the conventional portable rotary sawing machine that an alignment is often achieved in a wrong manner, when watching both the indicator gauge and scribing line. Once a wrong alignment has been achieved sawing operation is performed with a deviation from a correct alignment line without any possibility of remedial activity (see FIG. 13). Thus, it is important to ensure an exact alignment prior to starting sewing operation.

SUMMARY OF THE INVENTION

The present invention is intended to obviate the drawback inherent to the conventional portable rotary sawing machine as described above. To this end it is required that an exact alignment is established from the rotary saw through the V-shaped notch of the indicator gauge to the scribing line on the workpiece so that a correct sawing operation is performed in conformance with the predetermined scribing line on the workpiece with very few possibility of deviation therefrom. To satisfactorily meet the above-mentioned requirement there is proposed in accordance with the present invention a device for locating a correct sawing position for a portable rotary sawing machine with an indicator gauge having a V-shaped notch, said indicator gauge being fixedly secured to the side of a base which is adapted to be slidably placed on a workpiece to be sawn, wherein a rectangular opening or watching window is provided on the front part of the periphery of a stationary protective cover in the optimum position where an operator can clearly watch a rotary saw through said rectangular opening or watching window, whereby an alignment is ensured for the intended correct sawing operation by watching the rotary saw, the V-shaped notch of the indicator gauge and the scribing line on the workpiece at the same time.

In a preferred embodiment of the invention the rectangular opening or watching window is removably closed with a transparent protective cover plate preferably made of plastic material. When it is found that its transparency is increasingly reduced due to dust deposit on the reverse surface of the protective cover plate as sawing operation continues, it is removed or opened from the rectangular opening or watching window for the purpose of cleaning.

Alternatively, the rectangular opening or watching window may be removably closed with a protective cover plate having no transparency. Prior to starting sawing operation it is removed therefrom so that an intended alignment is achieved by watching the rotary saw, the V-shaped notch of the indicator gauge and the scribing line on the workpiece.

In other preferred embodiment of the invention the protective cover plate has the same curvature as the periphery of the stationary protective cover and is provided with stepped portions at both the upper and lower ends as well as a finger knob at the one side edge thereof, said stepped portions being received in guide grooves on the stationary protective cover, whereby it is slidably removed therefrom in the laterial direction.

Alternatively, the protective cover plate has the same curvature as the periphery of the stationary protective cover and is provided with stepped portions along both the side edges as well as a finger knob at the upper end thereof, said stepped portions being received in guide grooves on the stationary protective cover, so that it is slidably removed therefrom in the peripheral direction.

In another preferred embodiment of the invention the protective cover plate has the same curvature as the periphery of the stationary protective cover and is provided with a stepped portion along the one side edge as well as a low engagement projection and an upper finger knob at the other side edge thereof, said stepped portion being engaged to the bottom of the one inner edge of the rectangular opening or watching window, while said lower engagement projection being press fitted into the other inner edge of the same, whereby it is removed upward therefrom by turning about said one inner edge.

Alternatively, the protective cover plate has the same curvature as the periphery of the stationary protective cover and is provided with a stepped portion along the lower edge as well as a lower engagement projection and an upper finger knob at the upper side thereof, said stepped portion being engaged to the bottom of the lower inner edge of the rectangular opening or watching window, while said lower engagement projection being press fitted into the upper inner edge of the same, whereby it is removed upwards therefrom by turning about said lower inner edge.

In still another embodiment of the invention the protective cover has the same curvature as the periphery of the stationary protective cover and is provided with a hinge pin at the one side edge as well as an engagement projection and a finger knob at the other side edge thereof, said hinge pin being pivotally received in the corresponding recesses on the periphery of the stationary protective cover, while said engagement projection being press fitted into the other inner edge of the rectangular opening or watching window, whereby it is opened upwards by turning about said hinge pin.

According to another aspect of the present invention the device is constructed such that an indicating line in the form of a slit or a number of indicating holes are provided on the front part of the periphery of the stationary protective cover in the peripheral direction in the optimum position where an operator can clearly watch a rotary saw through the indicating line or points, whereby an alignment is ensured for the intended correct sawing operation by watching the rotary saw, the V-shaped notch of the indicator gauge and the scribing line on the workpiece at the same time.

Further, according to another aspect of the present invention the device is constructed such that the whole stationary protective cover or a part of the same is constructed of transparent material so that an alignment is ensured for the intended correct sawing operation by watching the rotary saw, the V-shaped notch of the indicator gauge and the scribing line on the workpiece at the same time. Preferably at least one third of the periphery of the stationary protective cover is constructed of transparent material on the front part thereof.

In order to keep the reverse surface of the transparent material free from dust or other foreign material it is preferable that the reverse surface of the transparent material is coated with dust-proof agent such as tetrafluoroethylene or the like.

Thus, it is an object of the present invention to provide a device for determining a correct sawing position for a portable rotary sawing machine which ensure a correct sawing operation merely by watching a rotary saw, V-shaped notch of indicator gauge and scribing line on a workpiece to be sawn prior to starting sawing operation.

It is other object of the present invention to provide a device for determining a correct sawing position for a portable rotary sawing machine which is simple in structure and is manufactured at an inexpensive cost.

It is another object of the present invention to provide a device for determining a correct sawing position for a portable rotary sawing machine which is easy to be operated without any necessity for special skill.

Other objects and advantageous features of the invention will be readily apparent from the reading of the following description made in connection with the accompanying drawings.

BRIEF DESCRIPTION OF THE ACCOMPANYING DRAWINGS

Now the present invention will be described in more details with reference to the accompanying drawings which illustrate several preferred embodiments of the invention, in which.

It is to be noted that the same or similar parts and components shown throughout the drawings are given the same reference numerals.

Figure 1:
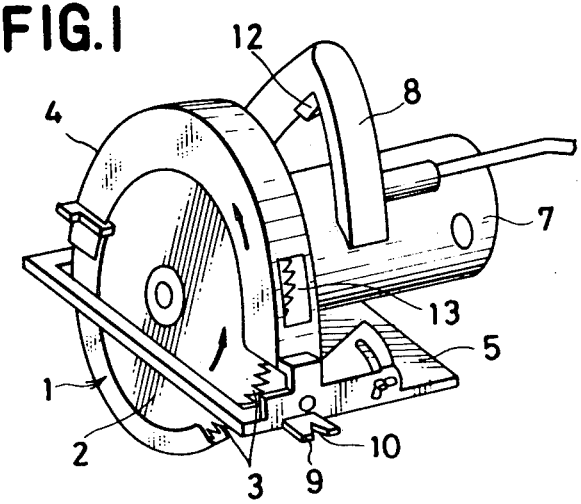
FIG. 1 is a perspective view of a portable sawing machine with a device for determining a correct sawing position in accordance with a typical embodiment of the invention mounted thereon.

As illustrated in FIG. 1, a typical portable rotary sawing machine generally designated by reference numeral 1 essentially comprises a rotary saw 2 with a number of sawing tips 3 arranged around the whole periphery thereof, a stationary protective cover 4 disposed over the upper part of said rotary saw 2, a base 5 pivotally secured to the side wall of said protective cover 4, said base 5 being adapted to be placed on a workpiece 6 to be sawn, and a motor (not shown) for driving the rotary saw 2 at a high rotational speed, said motor being encased in a casing 7. The whole rotary sawing machine 1 is carried by an operator with the aid of a handle 8. To ensure a correct position for sawing operation there is provided an indicator gauge 9 on the side wall of the base 5, wherein the required positioning is obtained by aligning the V-shaped notch 10 of said indicator gauge 9 with a scribing line 11 on the workpiece 6.

In operation the operator holds the rotary sawing machine by grasping the handle 8 with his hand and places it in front of the workpiece 6, while mounting a part of the base 5 thereon. After completion of a correct locating of the rotary sawing machine the operator depresses a push button 12 on the bottom of the handle 8. The operator is now ready to begin the sawing operation.

Figure 2:
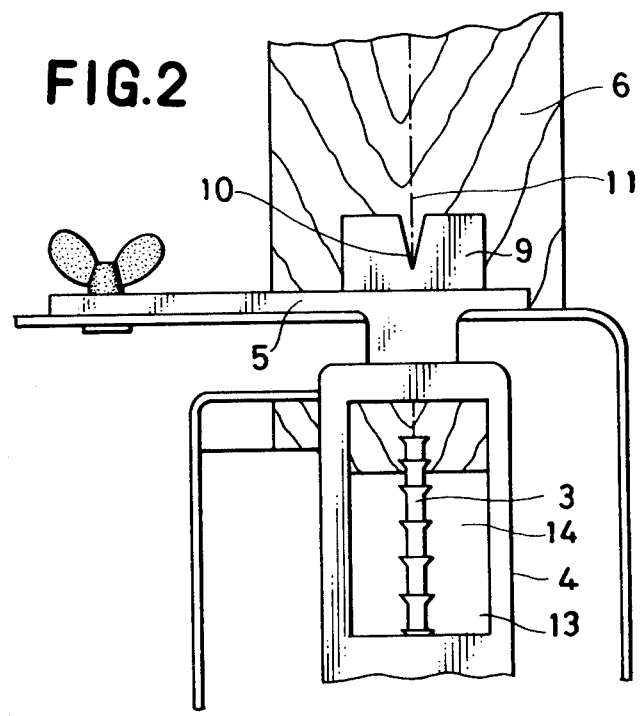
FIG. 2 is a partial plan view of the portable sawing machine in FIG. 1, illustrating in an enlarged scale how a correct alignment is ensured for sawing operation to be conducted.

To practice the present invention a rectangular opening or watching window 13 is provided on the upper surface of the stationary protective cover 4 in the vicinity of the side wall of the base 5 and is closed with a transparent protective cover plate 14. Said rectangular opening or watching window 13 is dimensioned such that an alignment is ensured by watching a straight line extending through the sawing tip 3 of the rotary saw 2, the V-shaped notch 10 of the indicator 9 and the scribing line 11 on the workpiece 6, as illustrated in FIG. 2. Prior to starting sawing operation the operator stands just in front of the end part of the workpiece 6, holding the rotary sawing machine at his hand, and then makes a correct alignment by watching first the line of sawing tips 3, then the V-shaped notch 10 of the indicator gauge 9 and finally the scribing line 11 on the workpiece 6. Once the required alignment has been settled, he can start his operation.

As is readily understood from the above description, the present invention consists in that the rectangular opening or watching window 13 is closed with the transparent cover plate 14 provided on the upper front portion of the stationary protective cover 4 in the optimum location where any operator can recognize a correct alignment line extending through the rotary saw 2, the V-shaped notch 10 of the indicator gauge 9 and the scribing line 11 on the workpiece 6.

When utilizing the device of the present invention, there is no danger of wrong sawing operation with any deviation from the scribing line 11.

Figure 3:
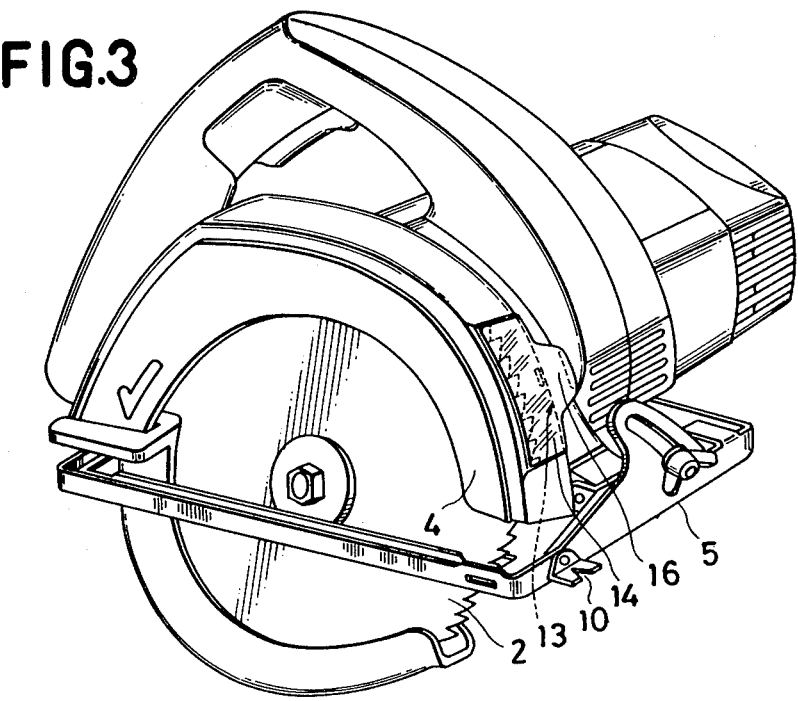
FIG. 3 is a perspective view of a portable sawing machine similar to FIG. 1 with a device in accordance with another embodiment of the invention mounted thereon.
Figure 4:
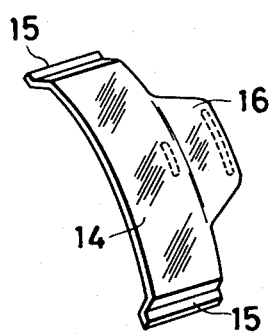
FIG. 4 is an enlarged perspective view of a removable transparent cover plate for the device in FIG. 3.

Next, FIGS. 3 and 4 illustrate the device in accordance with a modified embodiment of the present invention. In this embodiment the device is constructed in somewhat the same manner as in the foregoing with an exception that the transparent protective cover plate 14 is removably fitted onto the rectangular opening or watching window 13. Specifically, the device in accordance with this embodiment of the invention consists in that the transparent protective cover plate 14 is removable in the lateral direction relative to the stationary protective cover 4. As illustrated in FIG. 4, the transparent protective cover plate 14 has a curved configuration corresponding to that of the periphery of the stationary protective cover 4 and is provided with stepped portions 15 at both the upper and lower ends thereof. Further, it has a side projection 16 which serves as a finger knob for the purpose of easy removal. The stationary protective cover 4 contains upper and lower lateral guide grooves 15a, 15b in which said stepped portions 15 are received and along which they are adapted to slide in the lateral direction.

Figure 5:
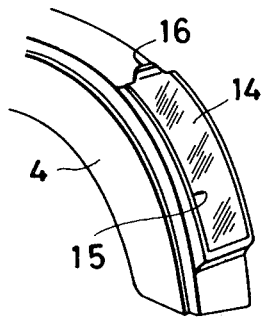
FIG. 5 is a partial perspective view of a portable sawing machine with a device in accordance with another embodiment of the invention.
Figure 6:
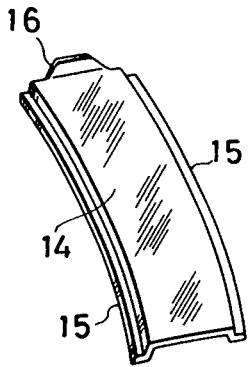
FIG. 6 is an enlarged perspective view of a removable transparent cover plate for the device in FIG. 5.

Further, FIGS. 5 and 6 illustrate the device in accordance with another modified embodiment of the invention. In this embodiment the transparent protective cover plate 14 has the similar configuration to that in FIGS. 3 and 4, but a difference therebetween is that it is adapted to slide in the peripheral direction. To this end the transparent cover plate 14 for the device is provided with stepped portions 15 along both the side edges whereas the finger knob 16 is located at the top end thereof. It is to be noted that the stationary protective cover 4 contains guide grooves (not shown) corresponding to said stepped portions 15, said guide grooves extending by a predetermined distance in the peripheral direction.

Figure 7:
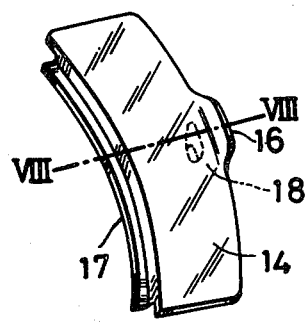
FIG. 7 is an enlarged perspective view of a removable transparent cover plate for the device in accordance with the fourth embodiment of the invention.
Figure 8:
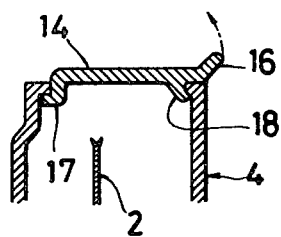
FIG. 8 is a partial cross-sectional view of the removable cover plate fitted into a rectangular opening watching window on the stationary protective cover of the portable rotary sawing machine, taken substantially in line VIII—VIII in FIG. 7.

Next, FIGS. 7 and 8 illustrate the device in accordance with the fourth embodiment of the invention. In this embodiment the transparent protective cover plate 14 is also removable but removal is effected in a different manner from the foregoing embodiments. Specifically, the transparent curved protective cover plate 14 has a stepped portion 17 along the one side edge which is adapted to be engaged to the bottom part of one of the inner edges of the rectangular opening 13 on the stationary protective cover 4, whereas it has a small engagement projection 18 located in the vicinity of the finger knob 16, said projection 18 being adapted to be engaged to the other edge of the rectangular opening 13 in the manner of a press fit. When fitting the transparent protective cover plate 14 into the rectangular opening 13, the stepped portion 17 is first engaged and then the engagement projection 18 is depressed. On the contrary, when disconnecting it from the rectangular opening 13, the engagement projection 16 is pinched by operator's fingers and then it is lifted upwards as indicated with an arrow mark in FIG. 8.

Figure 9:
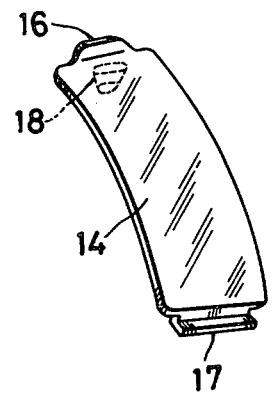
FIG. 9 is an enlarged perspective view of a removable transparent cover plate similar to FIG. 6 which is intended to be mounted for the device in accordance with the fifth embodiment of the invention.

Next, FIG. 9 illustrates a transparent protective cover plate for the device in accordance with the fifth embodiment of the invention. It has the similar configuration to that in FIG. 7. In this embodiment it contains the stepped portion 17 at the lower edge and the engagement projection 18 at the upper part thereof in the vicinity of the finger knob 16. In other words the stepped portion 17 and the engagement projection 16 are located at a right angle relative to those in FIG. 7.

Figure 10:
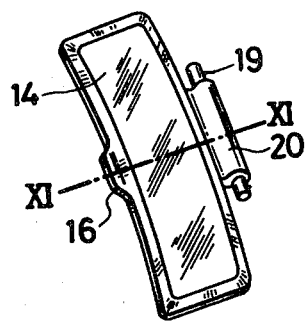
FIG. 10 is a perspective view of a pivotally removable transparent cover plate which is intended to be mounted for the device in accordance with the sixth embodiment of the invention.
Figure 11:
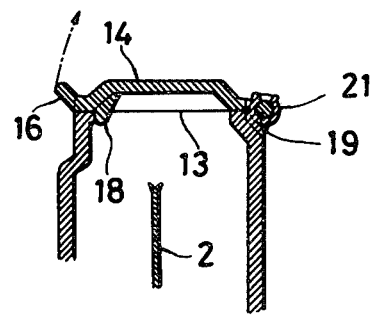
FIG. 11 is a partial cross-sectional view of the removable cover plate fitted into a rectangular opening or watching window on the protective cover of the portable rotary sawing machine, taken substantially in line XI—XI in FIG. 10.

Further, FIGS. 10 and 11 illustrate a transparent protective cover plate for the device in accordance with the sixth embodiment of the invention. As is readily apparent from the drawings, this embodiment of the invention is characterized in that the protective cover plate 14 is pivotally opened. Specifically, the protective cover plate 14 contains a hinge pin 19 which extends through a boss 20. On the other hand, the stationary protective cover 4 is formed with hinge pin receiving recesses 21 which are located in correspondence to said hinge pin 19. Further, the transparent protective cover plate 14 has an engagement projection 18 as well as a finger knob 16 both of which are located opposite to said boss 20, said engagement projection 18 being adapted to be press fitted into the rectangular opening 13 on the stationary protective cover 4.

Usually, the transparent protective cover plate 14 is fitted into the rectangular opening 13. As sawing operation continues and it becomes increasingly difficult to watch the rotating saw 2 within the stationary protective cover 4 due to dust deposit on the reverse surface thereof, an operator pinches the cover plate 14 at the finger projection 16 and pulls it upwards. It turns clockwisely about the hinge pin 20, as indicated with an arrow mark in FIG. 11. If required, the hinge pin 19 may be removed from the recessed portions 21 by expanding or enlarging the latter by force.

Although the cover plate 14 of the embodiments described above is preferably a transparent material, the cover plate 14 can also be opaque in which case it may be removed prior to beginning the sawing operation to ensure that the intended sawing alignment is achieved. Cover plates 14 in FIGS. 8 and 11 are therefore shown in cross-section as being formed of an opaque material.

Figure 12:
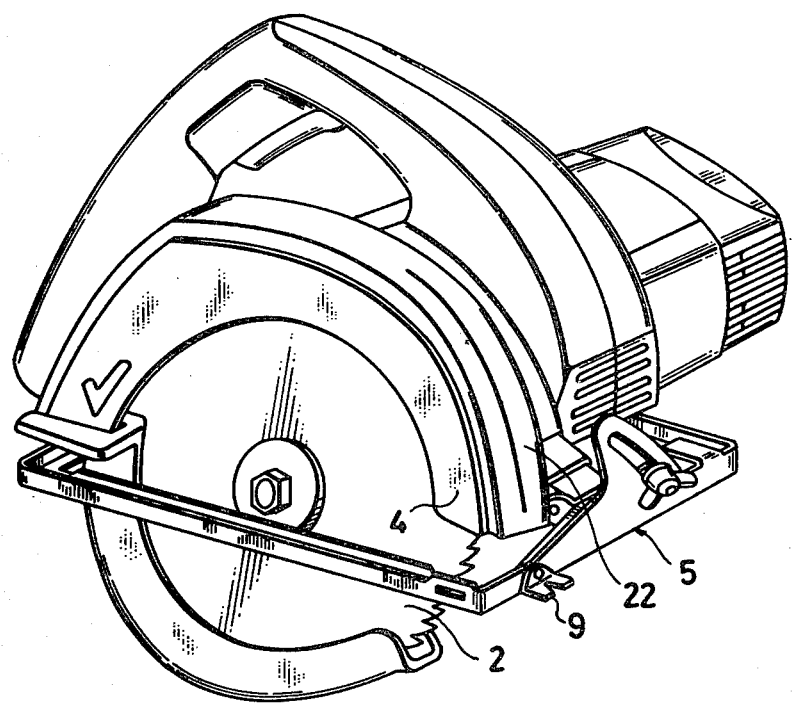
FIG. 12 is a perspective view of a portable rotary sawing machine with a device in accordance with the seventh embodiment of the invention mounted thereon.
Figure 13:
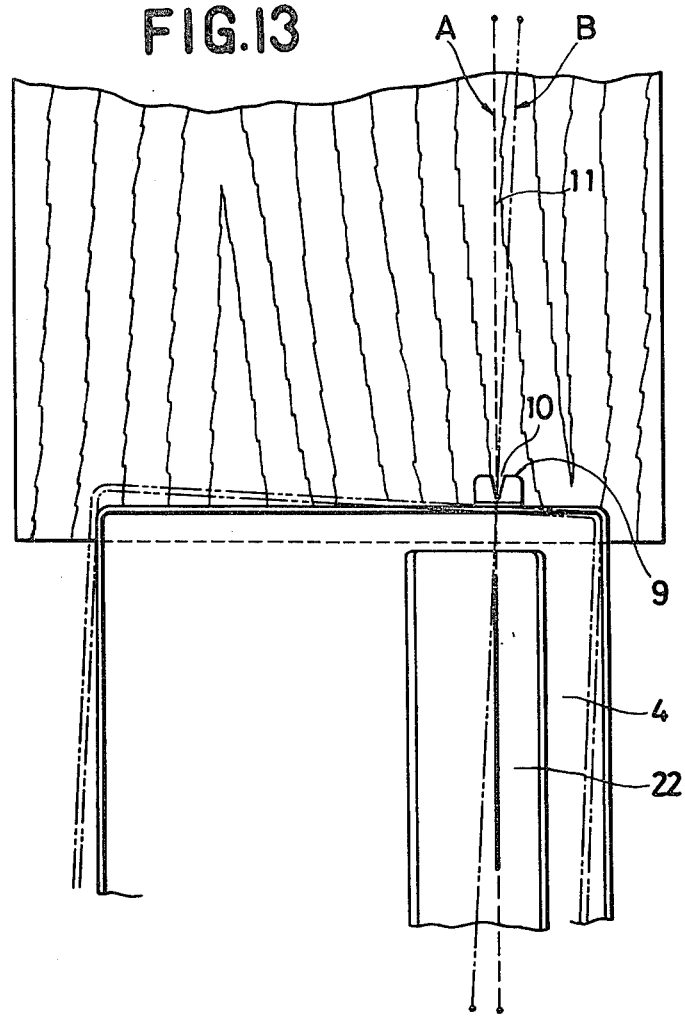
FIG. 13 is a partial plan view of the portable rotary sawing machine in FIG. 12, illustrating in an enlarged scale in the same manner as in FIG. 2 how a correct alignment is ensured for sawing operation to be conducted.

Next, FIGS. 12 and 13 illustrate another device in accordance with the seventh embodiment of the invention. In this embodiment there is provided no protective cover plate. In place of the combination of a rectangular opening and a protective cover plate as described in the foregoing embodiments there is provided just a single indicating line 22 in the form of a slit which extends by a predetermined distance on the periphery of the stationary protective cover 4. The intended alignment is achieved by watching the slit 22, the V-shaped notch 10 of the indicator gauge 9 and the scribing line 11 on the workpiece 6 as illustrated by a dotted line A in FIG. 13. In this connection it is to be noted that a wrong alignment line as designated by reference letter B is illustrated with a chain line which is apparently deviated from the correct alignment line that is an extension of the slot 22.

Figure 14:
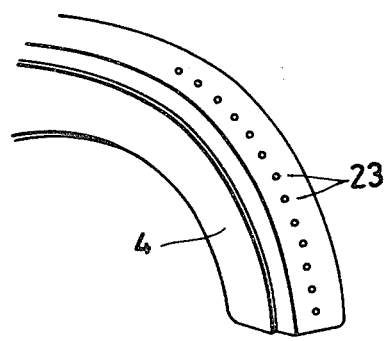
FIG. 14 is a partial perspective view of the stationary protective cover for the portable rotary sawing machine with a device in accordance with the eighth embodiment of the invention.

Further, FIG. 14 illustrates further another device in accordance with the eighth embodiment of the invention. In this embodiment the indicating line 22 in the preceding embodiment as illustrated in FIGS. 12 and 13 is replaced with a number of indicating holes 23 which are arranged in a line one after another at an equal distance. The required correct alignment is achieved in the same manner as illustrated in FIG. 13. In an extreme case just a single indicating hole 23 may be sufficient as far as a correct alignment is ensured for sawing operation.

Figure 15:
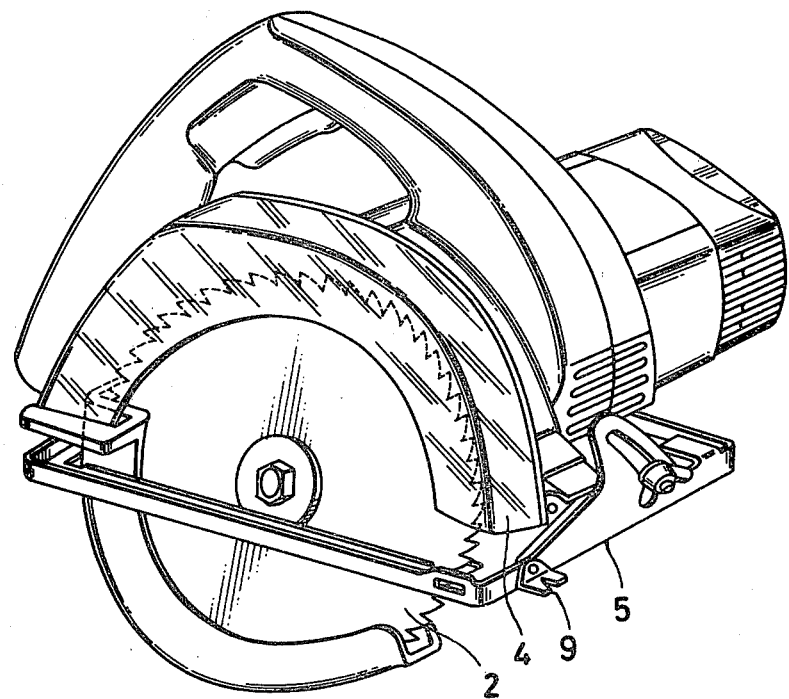
FIG. 15 is a perspective view of a portable rotary sawing machine with a device in accordance with the ninth embodiment of the invention.
Figure 16:
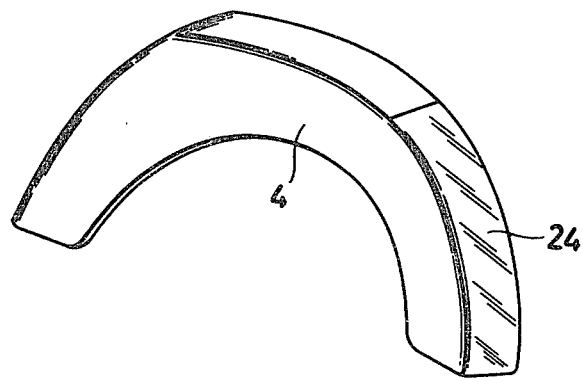
FIG. 16 is a perspective view of the stationary protective cover for the portable rotary sawing machine having a device in accordance with another embodiment of the present invention.

Finally, FIGS. 15 and 16 illustrate still further another device in accordance with the ninth embodiment of the invention. In this embodiment there is provided neither protective cover plate nor indicating line or hole for ensuring a correct alignment for sawing operation. This embodiment is characterized in that at least one third of the stationary protective cover 4 is made of transparent plastic material or other suitable transparent material having a light color. Specifically, in FIG. 15 the whole stationary protective cover 4 is made of transparent plastic material. As is readily understood, a right alignment line extending through the rotary saw 2, the V-shaped notch 10 of the indicator gauge 9 and the scribing line 11 on the workpiece 6 is very easily achieved by watching them at a glance.

In FIG. 16 about one third of the periphery of the stationary protective cover 4 is covered with a sheet of transparent plastic material as designated by reference numeral 24, whereas the residual part of the protective cover 4 is integrally made of conventional material such as steel plate, die cast product or the like.

To ensure long operation without frequent removal or opening of the transparent protective cover plate or the transparent part of the stationary protective cover for the purpose of cleaning it is preferable that the reverse surface of the transparent material is coated with any suitable dust-proof agent such as tetrafluoroethylene or the like.

The present invention has been described above with reference to the several preferred embodiments, but it should be of course understood that the present invention should be not limited only to these embodiments and that any change or modification may be made in the optimum manner without any departure from the spirit and scope of the invention. For instance, the curved protective cover plate may be made of material having no transparency and prior to starting sawing operation it may be removed or opened so as to ensure the intended alignment for a correct sawing position. Further, additional opening or openings may be provided in a certain position on the stationary protective cover for the purpose of ensuring further improved clear watching.

What is claimed is:

1. A device for determining a correct sawing position for a portable rotary sawing machine of the type having a peripherally curved stationary protective covering over a rotatable saw blade and a base adapted to be slideably placed on a workpiece to be sawn, said device comprising:
   an indicator gauge having a V-shaped notch fixedly attached to said base;
   window means defining a rectangular opening on the front portion of the periphery of said stationary protective covering in an optimum position to permit an operator to clearly watch said saw blade therethrough;
   means associated with said window means defining guide grooves; and
   a cover plate removably covering said rectangular opening and including means defining stepped portions at the upper and lower ends thereof and means establishing a finger knob to permit an operator to remove said cover plate from said rectangular opening, said stepped portions being slideably received in said guide grooves to permit sliding removal of said cover plate from said rectangular opening in a lateral direction relative said stationary protective covering; whereby
   alignment is ensured for the intended correct sawing operation by simultaneously watching the rotating saw blades, the V-shaped notch of the indicator gauge and the scribing line on the workpiece.

2. A device as in claim 1 wherein said cover plate is transparent.

3. A device as in claim 2 wherein the inner surface of the cover plate is protected with a dust-proof agent.

4. A device as in claim 3 wherein the dust-proof agent is tetrafluoroethylene.

5. A device as in claim 1 wherein said cover plate is opaque and is removed from said rectangular opening when an alignment is to be established prior to beginning the sawing operation.

6. A device as in claim 1 wherein said cover plate has the same peripheral curvature as said stationary protective covering.

7. A device for determining a correct sawing position for a portable rotary sawing machine of the type having a peripherally curved stationary protective covering over a rotatable saw blade and a base adapted to be slideably placed on a workpiece to be sawn, said device comprising:
   an indicator gauge having a V-shaped notch fixedly attached to said base;
   window means defining a rectangular opening on the front portion of the periphery of said stationary protective covering in an optimum position to permit an operator to clearly watch said saw blade therethrough;
   means associated with said window means defining guide grooves; and
   a cover plate removably covering said rectangular opening and including means defining stepped portions along both side edges thereof and means establishing a finger knob to permit an operator to remove said cover plate from said rectangular opening, said stepped portions being slideably received in said guide grooves to permit sliding removal of said cover plate from said rectangular opening in a peripheral direction relative said stationary protective covering; whereby alignment is ensured for the intended correct sawing operation by simultaneously watching the rotating saw blade, the V-shaped notch of the indicator gauge and the scribing line on the workpiece.

8. A device as in claim 7 wherein said cover plate is transparent.

9. A device as in claim 8 wherein the inner surface of the cover plate is protected with a dust-proof agent.

10. A device as in claim 9 wherein the dust-proof agent is tetrafluoroethylene.

11. A device as in claim 7 wherein said cover plate is opaque and is removed from said rectangular opening when an alignment is to be established prior to beginning the sawing operation.

12. A device as in claim 7 wherein said cover plate has the same peripheral curvature as said stationary protective covering.

13. A device for determining a correct sawing position for a portable rotary sawing machine of the type having a peripherally curved stationary protective covering over a rotatable saw blade and a base adapted to be slideably placed on a workpiece to be sawn, said device comprising:

an indicator gauge having a V-shaped notch fixedly attached to said base;

window means defining a rectangular opening on the front portion of the periphery of said stationary protective covering in an optimum position to permit an operator to clearly watch said saw blade therethrough; and cover plate means having a pair of side edges for removably covering said rectangular opening and including hinge means defining a stepped portion on one of said side edges and an engagement projection and a finger knob at the other of said side edges, said stepped portion being engaged with one side of said rectangular opening while said engagement projection is in a press-fitting relationship with the other side of said rectangular opening when said cover plate is in a covering relationship therewith, said hinge means for permitting said cover plate means to be upwardly removed by pivoting along said one side edge, whereby alignment is ensured for the intended correct sawing operation by simultaneously watching the rotating saw blade, the V-shaped notch of the indicator gauge and the scribing line one the workpiece.

14. A device as in claim 13 wherein said cover plate means is transparent.

15. A device as in claim 14 wherein the inner surface of the cover plate means is protected with a dust-proof agent.

16. A device as in claim 15 wherein the dust-proof agent is tetrafluoroethylene.

17. A device as in claim 13 wherein said cover plate means is opaque and is removed from said rectangular opening when an alignment is to be established prior to beginning the sawing operation.

18. A device as in claim 13 wherein said cover plate means has the same peripheral curvature as said stationary protective covering.

19. A device for determining a correct sawing position for a portable rotary sawing machine of the type having a peripherally curved stationary protective covering over a rotatable saw blade and a base adapted to be slideably placed on a workpiece to be sawn, said device comprising:

an indicator gauge having a V-shaped notch fixedly attached to said base;

window means defining a rectangular opening on the front portion of the periphery of said stationary protective covering in an optimum position to permit an operator to clearly watch said saw blade therethrough;

cover plate means removably covering said rectangular opening and including means defining an engagement projection for engaging one side edge of said rectangular opening and a finger knob to permit an operator to remove said cover plate from its covering relationship with said rectangular opening; and hinge means connecting said cover plate means to said stationary protective covering to permit said cover plate means to be hingedly moved between covering and uncovering positions relative said rectangular opening, whereby alignment is ensured for the intended correct sawing operation by simultaneously watching the rotating saw blade, the V-shaped notch of the indicator gauge and the scribing line on the workpiece.

20. A device as in claim 19 wherein said hinge means includes a hinge pin and means defining registered recesses on said cover plate means and stationary protective coverying for receiving said hinge pin therein.

21. A device as in claim 19 wherein said cover plate means is transparent.

22. A device as in claim 21 wherein the inner surface of the cover plate means is protected with a dust-proof agent.

23. A device as in claim 22 wherein the dust-proof agent is tetrafluoroethylene.

24. A device as in claim 19 wherein said cover plate means is opaque and is removed from said rectangular opening when an alignment is to be established prior to beginning the sawing operation.

25. A device as in claim 19 wherein said cover plate means has the same peripheral curvature as said stationary protective covering.

* * * * *